United States Patent
Seseke-Koyro et al.

(10) Patent No.: US 12,280,454 B2
(45) Date of Patent: Apr. 22, 2025

(54) FLUX FOR BRAZING

(71) Applicant: SOLVAY SA, Brussels (BE)

(72) Inventors: Ulrich Seseke-Koyro, Isernhagen (DE); Andreas Becker, Lachendorf (DE)

(73) Assignee: Solvay SA, Brussels (BE)

( * ) Notice: Subject to any disclaimer, the term of this patent is extended or adjusted under 35 U.S.C. 154(b) by 228 days.

(21) Appl. No.: 17/104,661

(22) Filed: Nov. 25, 2020

(65) Prior Publication Data

US 2021/0078114 A1 Mar. 18, 2021

Related U.S. Application Data

(63) Continuation of application No. 15/124,709, filed as application No. PCT/EP2015/055003 on Mar. 11, 2015, now abandoned.

(30) Foreign Application Priority Data

Mar. 11, 2014 (EP) .................... 14158706

(51) Int. Cl.
*B23K 35/36* (2006.01)
*B23K 1/20* (2006.01)
*B23K 35/02* (2006.01)
*B23K 35/362* (2006.01)
*B23K 35/365* (2006.01)

(52) U.S. Cl.
CPC ............ *B23K 35/362* (2013.01); *B23K 1/203* (2013.01); *B23K 35/0222* (2013.01); *B23K 35/0244* (2013.01); *B23K 35/3602* (2013.01); *B23K 35/3605* (2013.01); *B23K 35/3606* (2013.01); *B23K 35/3611* (2013.01); *B23K 35/365* (2013.01)

(58) Field of Classification Search
None
See application file for complete search history.

(56) References Cited

U.S. PATENT DOCUMENTS

| | | | |
|---|---|---|---|
| 3,951,328 A | 4/1976 | Wallace et al. | |
| 3,971,501 A | 7/1976 | Cooke | |
| 4,579,605 A | 4/1986 | Kawase et al. | |
| 4,619,716 A | 10/1986 | Suzuki et al. | |
| 5,100,486 A | 3/1992 | Krikorian et al. | |
| 5,593,532 A | 1/1997 | Falk et al. | |
| 6,733,598 B2 | 5/2004 | Swidersky et al. | |
| 8,381,965 B2 | 2/2013 | Jang et al. | |
| 9,722,103 B2 | 8/2017 | Sewell | |
| 2002/0005230 A1 | 1/2002 | Watsuji et al. | |
| 2006/0231162 A1 | 10/2006 | Swidersky et al. | |
| 2007/0164088 A1 | 7/2007 | Dianatkhah | |
| 2007/0277908 A1 | 12/2007 | Seseke-Koyro et al. | |
| 2009/0050239 A1 | 2/2009 | Honda et al. | |
| 2009/0139607 A1 | 6/2009 | Kool et al. | |
| 2011/0220617 A1 | 9/2011 | Becker et al. | |
| 2013/0037172 A1 | 2/2013 | Garcia-Juan et al. | |
| 2013/0059162 A1 | 3/2013 | Kobayashi et al. | |
| 2013/0333743 A1 | 12/2013 | Ishii et al. | |

FOREIGN PATENT DOCUMENTS

| | | |
|---|---|---|
| CN | 101434014 A | 5/2009 |
| EP | 0131444 A1 | 1/1985 |
| EP | 1808264 A1 | 1/2006 |
| JP | S6199569 A | 5/1986 |
| WO | 2006100054 A1 | 9/2006 |
| WO | 2010060869 A1 | 6/2010 |
| WO | 2011098120 A1 | 8/2011 |

*Primary Examiner* — Devang R Patel
(74) *Attorney, Agent, or Firm* — Osha Bergman Watanabe & Burton LLP

(57) ABSTRACT

The invention concerns a flux for brazing, a process for brazing metal parts employing said flux, a flux composition containing said flux, aluminum parts coated with said flux or said flux composition, a process for brazing and a brazed metal object obtainable by said brazing process. The flux is high in $KAlF_4$ and low in $K_3AlF_6$.

17 Claims, No Drawings

FLUX FOR BRAZING

This application is a continuation of U.S. application Ser. No. 15/124,709, filed Sep. 9, 2016, which is a U.S. national stage entry under 35 U.S.C. § 371 of International Application No. PCT/EP2015/055003 filed Mar. 11, 2015, which claims priority to European application No. 14158706.3; filed on Mar. 11, 2014. The entire contents of these applications are explicitly incorporated herein by this reference.

The invention concerns a flux for brazing, a process for brazing metal parts employing said flux, a flux composition containing said flux, aluminum parts coated with said flux or said flux composition, a process for brazing and a brazed metal object obtainable by said brazing process.

It is well known in the art that brazing of aluminum parts can be performed utilizing fluxes based on alkali metal fluoroaluminates. Fluxes of this type are generally considered to be noncorrosive. If contacted for extended times with water or aqueous liquids, aluminum parts brazed with potassium fluoroaluminate based fluxes show signs of corrosion. This is disclosed by Bo Yang et al. in Journal of ASTM International, Vol. 3, Issue 10 (2006). This corrosion seems to be caused by fluoride ions which are leached from brazing residues if the brazed parts are in contact with water or aqueous systems. This is especially disadvantageous when the brazed metal parts, which often bear contaminations from flux residue after brazing causing the corrosion and/or fluoride leaching, are used for coolers for stationary or mobile refrigeration equipment, such as air conditioning systems, or stationary heat exchangers or in cooling water for engines, for example engines for powering vehicles, as these are commonly continuously in contact with water or aqueous systems. Two effects have major disadvantages in such equipment: Corrosion of the metal parts, and clogging due to the reaction of the flux residue (most likely leached fluoride) with components of the cooling liquid, causing solid substances. Some improvement of the corrosion effect was achieved by addition of Li compounds to a flux system in WO2010060869.

JP patent application S61-099569 discloses a brazing flux comprising, on one hand, 73.6 to 99.7% $KAlF_4$ and 0.2 to 18.4% KF, and on the other hand, 0.1 to 8% of at least one additive selected from the group consisting of LiF, NaF and $CaF_2$. According to the examples explaining that invention, the content of KF is from 9.8 to 11%. All percentages are given as % by weight.

CN patent application 101434014 discloses a flux for joining aluminum and steel. The flux contains an increased amount of $K_3AlF_6$ relative to the eutectic amount which is said to be $KAlF_4+28\%$ $K_3AlF_6$.

EP patent application 0131444 discloses a flux for brazing aluminum parts which provides, after brazing, provides a corrosion-inhibiting metal film. This metal film is formed by the reaction between $ZnF_2$ or $SnF_2$ which are present in the flux, and aluminum from the parts to be brazed.

It has now been found that the presence of at least one additive salt comprising a cation selected from the group consisting of earth alkali metals and an anion selected from the group consisting of $F^-$, $CO_3^{2-}$, $O^{2-}$, nitrate, phosphate, borate, metaborate and oxalate in a brazing flux based on a fundamental flux comprising from 80 mol % to 100 mol % $KAlF_4$ enhances and thus improves the corrosion resistance of the brazed aluminum parts against water and aqueous systems compared to fluxes which do not contain such additives. The flux according to the invention provides for efficient fluxing and brazing while corrosion of the brazed parts is significantly reduced or even essentially prevented.

Without wishing to be bound by any theory, it is believed that the flux composition according to the invention prevents or reduces the formation of solid, generally fluoride containing, flux residues, on the brazed part, thereby improving resistance to corrosion. The flux residues further display an enhanced "hydrophilicity", which is indicated by an improved wettability of the flux residue; "hydrophilicity" in this context does not indicate solubility. The improved wettability of the flux residue results, for example, in enhanced drying of aqueous systems and/or water on the brazed part. Thereby, the contact time of such an aqueous system and/or water with the brazed part, and thus the corrosion of the brazed part, is reduced.

Thus, the flux of the invention comprises a) a brazing flux which is denoted as "fundamental flux", b) at least one additive salt, and optionally c) a brazing additive.

Thus, neither $ZnF_2$ nor $SnF_2$ must be present in the flux.

Accordingly, the present invention concerns a flux comprising a fundamental flux, wherein the fundamental flux comprises from 80 mol % to 100 mol % $KAlF_4$, the content of $K_3AlF_6$ is equal to or lower than 2 mol % including 0 mol %, and wherein the flux further comprises from 0.1 to 20 weight % of at least one additive salt, wherein the at least one additive salt comprises at least one anion selected from the group consisting of $F^-$, $CO_3^{2-}$, $O^{2-}$, nitrate, phosphate, borate, metaborate and oxalate, and at least one cation selected from the group consisting of earth alkali metal cations.

The invention further concerns a flux composition comprising the said flux and at least one fluxing additive selected from the group consisting of binders, thickeners, surfactants, thixotropic agents and solvents.

Aluminum parts for brazing which are coated at least partially with said flux and/or a said flux composition are also claimed. The invention further concerns a process for brazing of metal parts made from aluminum or aluminum alloys with metal parts made from aluminum, aluminum alloys, copper, titanium or steel, which comprises the steps of a) coating metal parts at least partially with the aforementioned flux and/or the aforementioned flux composition;
b) optionally drying the at least partially coated metal parts;
c) assembling the at least partially coated metal parts;
d) heating the assembled, at least partially coated metal parts to a temperature sufficiently high to braze the at least partially coated metal parts;
e) brazing the at least partially coated metal parts;
f) optionally cooling the brazed parts.

The invention also concerns a brazed metal object, obtainable by the aforementioned process.

The flux according to the present invention comprises a fundamental flux and at least one additive salt.

The term "fundamental flux" denotes the constituents of the flux of the invention but excluding the additive salt. The distinction between "fundamental flux" and "flux" according to the invention is made because the constitution of the "fundamental flux" is best expressed in % mol in respect of the main constituent or main constituents while the constitution of the "flux" is best expressed in % by weight wherein the sum of "fundamental flux" and the at least one additional salt, or, if more than one additive salt is present, of all additive salts is set to 100% by weight.

In other words, the flux of the invention comprises from 80 mol % to 100 mol % $KAlF_4$, from 0.1 to 20 weight % of at least one additive salt, wherein the at least one additive salt comprises at least one anion selected from the group consisting of $F^-$, $CO_3^{2-}$, $O^{2-}$, nitrate, phosphate, borate, metaborate and oxalate, and at least one cation selected from the group consisting of earth alkali metal cations; and optionally, if the content of $KAlF_4$ is from 80 mol % to less than 100 mol %, at least one or more flux component which is selected from the group consisting of $K_2AlF_5$, $K_3AlF_6$, potassium fluorozincates, cesium fluoroaluminates, potassium fluorostannates and cesium fluorostannates, and hydrates of all the foregoing, where applicable.

In the following, the fundamental flux will be explained in detail.

According to the present invention, the fundamental flux generally comprises from 80 mol % to 100 mol % $KAlF_4$. Thus, $KAlF_4$ is the main constituent of the fundamental flux. Often, the $KAlF_4$ content is equal to or higher than 80 mol %. Preferably, the $KAlF_4$ content is equal to or higher than 90 mol %. Even more preferably, the $KAlF_4$ content is equal to or higher than 95 mol %. Most preferably, the $KAlF_4$ content is equal to or higher than 98 mol %. Often, the $KAlF_4$ content is equal to or lower than 100 mol %. Preferably, the $KAlF_4$ content is equal to or lower than 98 mol %. Even more preferably, the $KAlF_4$ content is equal to or lower than 95 mol %. In a very preferred aspect of the invention, the fundamental flux comprises exclusively or essentially exclusively $KAlF_4$. Mol % refers to the molar percentage of $KAlF_4$ with respect to the constitution of the fundamental flux.

Thus, according to one embodiment, the fundamental flux comprises 100 mol % of $KAlF_4$, and thus, consists of $KAlF_4$. In this embodiment, no additional fundamental flux component is present.

According to another embodiment of the present invention, the fundamental flux further comprises at least one additional fundamental flux component, wherein the at least one or more component is selected from the group consisting of $K_2AlF_5$, $K_3AlF_6$, potassium fluorozincates, cesium fluoroaluminates, potassium fluorostannates and cesium fluorostannates, and hydrates of all the foregoing, where applicable. Preferred additional fundamental flux components are $K_2AlF_5$, $K_2AlF_5 \cdot H_2O$, potassium fluorozincates, potassium fluorostannates, cesium fluorostannates and cesium fluoroaluminates. A most preferred additional fundamental flux component is $K_2AlF_5$, its hydrate or combinations thereof. $K_3AlF_6$ may also be contained; generally the content of $K_3AlF_6$ is equal to or lower than 2 mol %, and more preferably, it is equal to or lower than 1 mol %, and especially preferably, it is equal to or lower than 0.5 mol %, including 0 mol %. Especially preferably, the fundamental flux does not contain added $K_3AlF_6$. The at least one additional fundamental flux component generally is present in a molar content of from greater than 0 to 20 mol % with the limitation given above in view of $K_3AlF_6$. The molar content in the fundamental flux of the at least one additional fundamental flux component adds up with the molar content of the $KAlF_4$ to 100 mol % of the fundamental flux. Often, the content of the at least one additional fundamental flux component is equal to or higher than 0 mol %. Preferably, the content of the at least one additional fundamental flux component is equal to or higher than 2 mol %. Even more preferably, the content of the at least one additional fundamental flux component is equal to or higher than 5 mol %. Often, the content of the at least one additional fundamental flux component is equal to or lower than 20 mol %. Preferably, the content of the at least one additional fundamental flux component is equal to or lower than 10 mol %. Even more preferably, the content of the at least one additional fundamental flux component is equal to or lower than 5 mol %. In a very preferred aspect of the invention, any other additional fundamental flux component except $KAlF_4$ is absent or essentially absent. Commercially available fundamental fluxes which can be used as such or as fundamental flux component include, for example, Nocolok® Flux (a mixture of $KAlF_4$ and $K_2AlF_5$), Nocolok® Flux Drystatic (a mixture of $KAlF_4$ and $K_2AlF_5$ with a specific range of particle size distribution), Nocolok® Cs Flux (a mixture of $KAlF_4$, $K_2AlF_5$ and cesium fluoroaluminate) and Nocolok® Zn Flux (potassium fluorozincate). In the present invention, weight % refers to the total weight of the flux, if not otherwise defined.

Chlorides, NaF and free KF are considered as undesired impurities. The content of chlorides, e.g. LiCl, NaCl and KCl, in the flux of the invention is equal to or greater than 0 to equal to or lower than 0.1% by weight. The content of NaF and KF in the flux is equal to or greater than 0 to lower than 0.2% by weight. Preferably, the flux is essentially free of chlorides, NaF and KF. The term "essentially free" denotes that chlorides, NaF and KF are contained at most in undesired traces, preferably, that the total content of chlorides is equal to or lower than 0.05% by weight and the total content of the sum of NaF and KF is preferably equal to or lower than 0.1% by weight. The term "KF" denotes free KF which is not present in complex form, e.g. in the form of $KAlF_4$. The content of these impurities is given relative to the flux set as 100% by weight.

Most preferably, the fundamental flux does not contain added chlorides, added NaF and added KF.

Preferably, the flux of the invention, if at all, contains $ZnF_2$ and $SnF_2$ only as undesired traces, e.g. in amounts from equal to or greater than 0 to equal to or lower than 0.05% by weight. Preferably, the flux does not contain $ZnF_2$ or $SnF_2$.

According to the present invention, the flux comprises at least one additive salt. The at least one additive salt comprises at least one anion selected from the group consisting of $F^-$, $CO_3^{2-}$, $O^{2-}$, nitrate, phosphate, borate, metaborate and oxalate, and at least one cation selected from the group consisting of earth alkali metal cations. For example, the at least one additive salt is selected from the group consisting of $CaF_2$, $BeF_2$, $MgF_2$, $BaF_2$, $SrF_2$, CaO, BeO, MgO, BaO, SrO, $CaCO_3$, $BeCO_3$, $MgCO_3$, $BaCO_3$, and $SrCO_3$. More preferably, the at least one additive salt is selected from the group consisting of $CaF_2$, $BeF_2$, $MgF_2$, $BaF_2$ and $SrF_2$. The at least one additive salt most preferably is $CaF_2$ or $MgF_2$ or a mixture thereof. The at least one additive salt is generally present in the flux in a weight percentage of from 0.1 to 20 weight %. Often, the at least one additive salt is present in the flux in a weight percentage of equal to or more than 0.5 weight %. Preferably, the at least one additive salt is present in the flux in a weight percentage of equal to or more than 1 weight %. Most preferably, the at least one additive salt is present in the flux in a weight percentage of equal to or more than 1.5 weight %. Often, the at least one additive salt is present in the flux in a weight percentage of equal to or less than 18 weight %. Preferably, the at least one additive salt is present in the flux in a weight percentage of equal to or less than 15 weight %. Most preferably, the at least one additive salt is present in the flux in a weight percentage of equal to or more than 10 weight %. In a very preferred embodiment of the invention, if the content of $KAlF_4$ in the fundamental flux is equal to or higher than 80 mol % (mol % of fundamental flux), the at least one additive salt is present in the flux in an amount of equal to or higher than 2.5 weight % (weight % relating to the total weight of the flux).

In one aspect of the present invention, the flux may further comprise at least one brazing additive. If appropriate the at least one brazing additive is preferably selected from the group consisting of Si, LiOH, LiF, Li fluoroaluminates, lithium potassium fluoroaluminates, solder metals and solder metal precursors. "Solder" is also referring to "filler" or "filler metal". Especially preferred brazing additives are selected from the group consisting of solder metals and Si. Exemplary solder metals are Al—Si alloys, whereas examples of solder metal precursors are Si, copper or germanium. Commercially available fundamental fluxes which already comprise brazing additives as described above include Nocolok® Sil Flux. The weight percentages or fundamental flux, at least one salt additive and optionally at least one brazing additive add up to 100 weight %.

In one embodiment, no brazing additive is present.

In another embodiment, a brazing additive is present. Generally, the at least one brazing additive is then present in the flux in a weight percentage of from more than 0 to 30 weight %. Often, the at least one brazing additive is present in the flux in a weight percentage of equal to or more than 0.5 weight %. Preferably, the at least one brazing additive is present in the flux in a weight percentage of equal to or more than 1 weight %. Most preferably, the at least one brazing additive is present in the flux in a weight percentage of equal to or more than 1.5 weight %. Often, the at least one brazing additive is present in the flux in a weight percentage of equal to or less than 30 weight %. Preferably, the at least one brazing additive is present in the flux in a weight percentage of equal to or less than 15 weight %. Most preferably, the at least one brazing additive is present in the flux in a weight percentage of equal to or more than 10 weight %. In a preferred embodiment of the invention, when Li is present in the flux as brazing additive, the molar content of $KAlF_4$ in the fundamental flux is equal to or higher than 95 mol %, wherein mol % relates to the molar composition of the fundamental flux. The brazing additive is preferably selected from the group consisting of Si and solder metal, especially solder metal consisting of Al—Si alloys.

In a very preferred embodiment, the flux of the invention consists of $KAlF_4$, at least one additive salt comprising a cation selected from the group consisting of earth alkali metals and an anion selected from the group consisting of $F^-$, $O^{2-}$, and $CO_3^{2-}$, and the flux optionally further contains $K_2AlF_5$, $K_2AlF_5 \cdot H_2O$, cesium fluoroaluminate, Si and/or a solder metal, especially a Si—Al alloy.

In an especially preferred embodiment, the flux of the invention consists of $KAlF_4$, at least one additive salt selected from the group consisting of $CaF_2$, $BeF_2$, $BaF_2$, $SrF_2$, and the flux optionally further contains at least one compound selected from the group consisting of $K_2AlF_5$, $K_2AlF_5 \cdot H_2O$, cesium fluoroaluminate, Si and solder metal, especially a Si—Al alloy. If desired, fluxes with specific particle sizes can be selected for specific methods of application. For example, the particles, including any brazing additives, may have the particle size distribution as disclosed in U.S. Pat. No. 6,733,598, which is incorporated by reference into the present patent application and are especially suitable for application according to the dry method, e.g. by electrostatic power, as is further detailed in U.S. Pat. No. 6,733,598. The particles of the flux may be of a coarser nature than the finer particles disclosed in said U.S. Pat. No. 6,733,598. Such coarser fluxes are very suitable for the application in the form of a flux composition including the flux dispersed a solvent; they can, for example, be applied by painting, printing or spraying onto the parts. The flux may also have a distinct particle size distribution as disclosed in US application US2013/0037172, which is incorporated by reference into the present patent application which results in specific advantageous sedimentation behavior and viscosity in wet applications. The flux can be applied as such as dry powder, for example, electrostatically as described in U.S. Pat. No. 6,733,598 or by applying a low temperature plasma, as described in WO 2006/100054, which is incorporated by reference into the present patent application. In this plasma process, finely divided flux powder is partially molten by a low temperature plasma beam and sprayed onto the surface of the aluminum parts to be joined. The flux formed from the flux and the brazing additives mentioned above can be applied to the brazing process according to the principles mentioned above.

As to the potential content of chlorides, NaF and KF in the flux which are considered as undesired impurities, it is referred to the remarks made above in respect to the fundamental flux. The content of chlorides, e.g. LiCl, NaCl and KCl, in the flux of the invention is equal to or greater than 0 to equal to or lower than 0.1% by weight. The content of NaF and KF in the flux of the invention is equal to or greater than 0 to equal to or lower than 0.1% by weight. Preferably, the flux of the invention is essentially free of chlorides, NaF and KF. The term "essentially free" denotes that chlorides, NaF and KF are contained at most in undesired traces, preferably, that the total content of chlorides is equal to or lower than 0.05% by weight and the total content of the sum of NaF and KF is preferably equal to or lower than 0.1% by weight. The content of these impurities is given relative to the flux of the invention set as 100% by weight.

Most preferably, the flux of the invention does not contain added chlorides, added NaF and added KF.

The invention also concerns a flux composition comprising the flux of the invention. The flux composition of the present invention which is suitable for the wet fluxing method contains the flux, optionally including one or more of the brazing additives as described above, and at least one of the fluxing additives selected from the group consisting of solvents, binders, thickeners, suspension stabilizers, antifoaming agents, surfactants and thixotropic agents.

In one preferred embodiment, the flux composition comprising the flux contains the flux suspended in a solvent, especially in water, water-free organic liquids or aqueous organic liquids. Preferred liquids are those that have a boiling point at ambient pressure (1 bar abs) of equal to or lower than 350° C. The term "suspended in water" does not exclude that a part of the flux composition is dissolved in the liquid; this may be the case especially when water or aqueous organic liquids are contained. Liquids that are preferred are deionized water, mono-, di- or tribasic aliphatic alcohols, especially those with 1 to 4 carbon atoms, e.g. methanol, ethanol, isopropanol, or ethylene glycol, or glycol alkyl ethers, wherein alkyl preferably denotes linear C1 to C4 alkyl or branched aliphatic C3 to C4 alkyl, including methyl, ethyl, iso-propyl, n-propyl, n-butyl, iso-butyl, sec-butyl, and tert-butyl. Non-limiting examples are glycol monoalkyl ethers, e.g. 2-methoxyethanol or diethylene glycol, or glycol dialkyl ethers, for example, dimethyl glycol (dimethoxyethane). Mixtures comprising two or more of the liquids are also suited very well. Isopropanol or mixtures containing isopropanol are especially suitable.

The composition comprising the flux suspended in a liquid may also contain further fluxing additives, for example, thickener, surfactants or thixotropic agents.

In an especially preferred embodiment, the flux is present in the form of a flux composition wherein the flux is suspended in a liquid which also contains a binder. Binders improve, for example, the adhesion of the flux mixture after their application on the parts to be brazed. Thus, the wet flux method using a flux composition comprising flux, binder and water, organic liquid or aqueous organic liquid is a preferred embodiment of the brazing process of the present invention.

Suitable binders can be selected for example from the group consisting of organic polymers. Such polymers are physically drying (i.e., they form a solid coating after the liquid is removed), or they are chemically drying (they may form a solid coating e.g. under the influence of chemicals, e.g. oxygen or light which causes a cross linking of the molecules), or both. Suitable polymers include polyolefines, e.g. butyl rubbers, polyurethanes, resins, phthalates, polyacrylates, polymethacrylates, vinyl resins, epoxy resins, nitrocellulose, polyvinyl acetates or polyvinyl alcohols. Flux compositions containing water as liquid and water-soluble polymers, for example, polyurethane, or polyvinyl alcohol as binder are especially suitable because they have the advantage that, during the brazing process, water is evaporated instead of possibly flammable organic liquids.

The compositions may include other additives which improve the properties of the composition, for example, suspension stabilizers, surfactants, especially nonionic surfactants, e.g. Antarox BL 225, a mixture of linear C8 to C10 ethoxylated and propoxylated alcohols, thickeners, e.g. methyl butyl ether, thixotropic agents, e.g. gelatine or pectines, or a wax as described in EP-A 1808264.

The content of the flux (including fundamental flux, the at least one additive salt and, if present, other additives, e.g. solder metal, solder precursor) in the total composition (including liquid or liquids, thixotropic agents, surfactants and binders, if present) generally is equal to or greater than 0.75% by weight. Preferably, it is equal to or greater than 1% by weight. More preferably, the flux content in the composition is equal to or greater than 5% by weight, very preferably, equal to or greater than 10% by weight of the total flux composition. Generally, the flux content in the composition is equal to or lower than 70% by weight. Preferably, it is equal to or lower than 50% by weight.

The binder, if present, is generally contained in an amount of equal to or greater than 0.1% by weight, preferably equal to or greater than 1% by weight of the total flux composition. The binder, if present, is generally contained in an amount equal to or lower than 30% by weight, preferably equal to or lower than 25% by weight of the total composition.

The thixotropic agent, if present, is generally contained in an amount of equal to or greater than 1% by weight of the total flux composition. Generally, if present, it is contained in an amount equal to or lower than 20% by weight, preferably equal to or lower than 10% by weight of the total flux composition.

The thickener, if present, is generally contained in an amount of equal to or greater than 1% by weight, preferably equal to or greater than 5% by weight of the total flux composition. Generally, the thickener, if present, is contained in an amount equal to or lower than 15% by weight, preferably equal to or lower than 10% by weight of the total composition.

Highly suitable flux compositions for wet applications contain 10 to 70% by weight of the flux (including the at least one additive salt and optional solder metal or solder precursor), 1 to 25% by weight binder, 0 to 15% by weight of a thickener, 0 to 10% by weight of a thixotropic agent, and 0 to 5% by weight of other additives, e.g. a surfactant or a suspension stabilizer. Preferably, the reminder to 100% by weight is water, an organic solvent or an aqueous organic solvent.

In one specific embodiment, the flux composition comprising the flux is free of any water or water-free or aqueous organic liquid, but contains the flux (including the at least one additive salt, and optionally one or more of the solder metal or precursor) as described above, and a water-soluble organic polymer as a binder which is present in the form of a water soluble package for the flux. For example, polyvinyl alcohol is very suitable as water-soluble package for the flux as described in US patent application publication 2006/0231162. Such packages can be handled without dust formation, and after addition of water, they form a suspension in water including a flux and the water soluble polymer as binder.

Another aspect of the present invention is the provision of a process for brazing of metal parts made from aluminum or aluminum alloys with metal parts made from aluminum, aluminum alloys, copper, titanium or steel comprising a step wherein the aforementioned flux or the aforementioned flux composition comprising the flux is applied to a part of the surface (including those parts of the surface which will be joined during brazing) or the entire surface of the parts to be brazed, so that the metal parts are at least partially coated. Optionally, the at least partially coated metal parts can be dried. After fluxing, these parts are assembled, heated to a temperature sufficiently high to braze the at least partially coated metal parts and brazed, or, alternatively, the parts to be brazed are assembled, then fluxed, heated to a temperature sufficiently high to braze the at least partially coated metal parts and then brazed. Optionally, the brazed parts can be subjected to a heat treatment after brazing. The flux or flux composition comprising the flux is described in detail above.

For the claimed process for brazing of metal parts, the flux can be applied according to the dry fluxing method described above and further referenced to in U.S. Pat. No. 6,733,598. The wet flux compositions can alternatively be applied to the metal parts according to methods known in the art. For example, they can be sprayed onto the surface thus forming coated metal parts; alternatively, they can be applied by immersing the metal parts to be coated into the flux composition; or by painting or printing the flux composition onto the metal parts to be brazed thus forming coated parts. It has to be kept in mind that the term "metal" includes aluminum alloys. Generally, the at least partially coated metal parts made from aluminum or aluminum alloys may be brazed with metal parts made from aluminum, aluminum alloys, copper, titanium or steel. The liquid-free flux composition containing flux, water-soluble binder and optionally further additives in the form of a package can be put into water before use to form an aqueous flux composition containing suspended flux mixture and dissolved binder.

Generally, the metal parts at least partially coated with the wet flux composition are dried (this is of course not necessary in parts coated according to the dry method unless applies fluoroaluminate hydrates and wants to remove crystal water before starting the brazing process). Drying can be performed independently from brazing; the dried, at least partially flux-coated metal parts can then be stored until they are brazed. Alternatively, drying can be performed directly in the brazing apparatus or in a separate drying apparatus just before the brazing operation.

Generally, for brazing, the at least partially coated metal parts to be joined by brazing are assembled (before or after drying if coated according to a wet process) and heated to a "holding temperature" of from about 540° C. to about 650° C. The holding temperature often is equal to or more than 540° C. More preferably, the holding temperature is equal to or more than 550° C. Even more preferably, the holding temperature is equal to or more than 560° C. Often, the holding temperature is equal to or less than 650° C. More preferably, the holding temperature is equal to or less than 620° C. Even more preferably, the holding temperature is equal to or less than 610° C. In order to reach the holding temperature, a temperature gradient is used which is suitable for the brazing system, for example taking into account the metal parts to be brazed, the flux or flux composition, and brazing equipment which is employed. For example, a heating rate of 30°/min may be suitable. The time during which the holding temperature is applied, also referred to as holding time, often is equal to or more than 30 seconds. More preferably, the holding time is equal to or more than 60 seconds. Even more preferably, the holding time is equal to or more than 90 seconds. Often the holding time is equal to or less than 10 minutes. More preferably, the holding time is equal to or less than 5 minutes. Most preferably, the holding time is equal to or less than 3 minutes. The heating can be done in an inert gas atmosphere, e.g. helium, nitrogen, argon and/or xenon atmosphere, or mixtures of those gases; this is also referred to as "CAB" conditions (controlled atmosphere brazing).

In one embodiment of the invention, the brazing process also comprises a step of cooling the brazed parts. This cooling may be performed actively, for example by applying a stream of inert gas to the brazed parts, or inactively by letting the temperature drop to ambient temperature after the heating is stopped. Preferably, the step of cooling the brazed parts is performed in an inert gas atmosphere, e.g. helium, nitrogen, argon and/or xenon atmosphere, or mixtures of those gases.

It was found that brazing products which were brazed with the flux of the invention which comprises the at least one additive salt generally are very resistant to corrosion due to the very low solubility, specifically low fluoride leaching, of the flux residue after brazing. This also has the favorable effect that solids that form by interaction of aqueous systems that are employed e.g. in coolers/heat exchangers with the brazing residue, are avoided, which prevents clogging of the cooler/heat exchanger systems.

A further aspect of the present invention concerns aluminum parts or aluminum alloy parts, coated at least partially with the additive salt containing flux, or the flux composition comprising the flux, of the present invention. These parts preferably are parts used to produce heat exchangers, e.g. tubes and fins.

Another aspect of the present invention concerns a brazed metal object, which is obtainable by the following process for brazing of metal parts made from aluminum or aluminum alloys with metal parts made from aluminum, aluminum alloys, copper, titanium or steel, which comprises the steps of
  a) coating metal parts at least partially with a flux according to the foregoing description and/or a flux composition according to the foregoing description;
  b) optionally drying the at least partially coated metal parts;
  c) assembling the at least partially coated metal parts;
  d) heating the assembled, at least partially coated metal parts to a temperature sufficiently high to braze the at least partially coated metal parts;
  e) brazing the at least partially coated metal parts;
  f) optionally cooling the brazed parts.

The process details by which the brazed metal object is obtainable are identical to those described above for the "process for brazing of metal parts made from aluminum or aluminum alloys with metal parts made from aluminum, aluminum alloys, copper, titanium or steel", as described above.

In one embodiment of the present invention, the brazed metal object, obtainable as previously described by the process for brazing of metal parts made from aluminum or aluminum alloys with metal parts made from aluminum, aluminum alloys, copper, titanium or steel, forms part of a cooler for stationary or mobile refrigeration equipment, such as air conditioning equipment, or of a stationary heat exchanger. Generally, the brazed metal object may be present in any section of the cooler of the stationary or mobile refrigeration equipment, or of the stationary heat exchanger. Often, the brazed metal parts obtainable by the previously described process are cooler parts which are in contact with cooling agents. Such cooling agents can be either aqueous, for example water-alcohol mixtures, wherein preferably ethyleneglycol is used, or non-aqueous, for example halogenated hydrocarbons or oils. The brazed metal objects are especially preferred for use in motor vehicles, as part of the internal combustion engine cooler, or as part of the air conditioning appliance in motor vehicle. The term "motor vehicle" includes cars, motor cycles and buses, but also ships, airplanes and other transport vehicles. Another advantageous application for the said brazed metal parts is air conditioning equipment which cools rooms and/or spaces, for human or animal occupancy, or storage. This air conditioning equipment may be either mobile or stationary.

Should the disclosure of any patents, patent applications, and publications which are incorporated herein by reference conflict with the description of the present application to the extent that it may render a term unclear, the present description shall take precedence.

The examples which follow are intended to illustrate the present invention without, however, limiting the scope thereof.

EXAMPLE 1

Nocolok Flux® with 3% of $BaF_2$ was homogenized thoroughly in a ball mill. An amount of 5 gram/m$^2$ of this powder blend was evenly distributed on a cladded (4343) Aluminum 3003 coupon of 2.5 by 2.5 cm in size. The cladded Aluminum part was assembled with an aluminum angle. The assembled parts were placed in a lab brazing furnace (volume 2.5 L), with a controlled atmosphere of nitrogen gas (11 L/min). The brazing furnace containing the assembled parts was heated with a rate of 30° C./min. Upon reaching the holding temperature of 605° C., the furnace was held at 605° C. for 2 minutes. The heating was stopped and the setup cooled under nitrogen atmosphere. Overall brazing time was 22 minutes, cooling down was 4 minutes.

The brazed coupon—down to ambient temperature—was then soaked 10 days at ambient temperature in a closed beaker containing 40 ml DI-water. (DI-water: deionized water).

Fluoride content in mg/L of soaking water:
Nocolok®+3% BaF$_2$: 6.5
Nolocok® w/o additive: 7.5

EXAMPLE 2

KAlF$_4$ with 3%, respectively 1.5%, of BaF$_2$ was homogenized thoroughly in a ball mill. An amount of 5 gram/m$^2$ of this powder blend was evenly distributed on a cladded (4343) Aluminum 3003 coupon of 2.5 by 2.5 cm in size. The cladded Aluminum part was assembled with an aluminum angle. The assembled parts were placed in a lab brazing furnace (volume 2.5 L), with a controlled atmosphere of nitrogen gas (11 L/min). The brazing furnace containing the assembled parts was heated with a rate of 30° C./min. Upon reaching the holding temperature of 605° C., the furnace was held at 605° C. for 2 minutes. The heating was stopped and the setup cooled under nitrogen atmosphere. Overall brazing time was 22 minutes, cooling down was 4 minutes.

The brazed coupon—down to ambient temperature—was then soaked 10 days at ambient temperature in a closed beaker containing 40 ml DI-water. (DI-water: deionized water).

Fluoride content in mg/L of soaking water:
KAlF$_4$+3% BaF$_2$: 4.5
KAlF$_4$+1.5% BaF$_2$: 4.0
KAlF$_4$ w/o additive: 5.5

The invention claimed is:

1. A flux comprising a fundamental flux, wherein the fundamental flux comprises:
   from 80 mol % to 100 mol % KAlF$_4$, and
   one or more components selected from the group consisting of K$_2$AlF$_5$, K$_3$AlF$_6$, potassium fluorozincates, cesium fluoroaluminates, potassium fluorostannates and cesium fluorostannates, and hydrates thereof, wherein the one or more components are comprised in the fundamental flux from 0 to 20 mol %, adding up with the content of KAlF$_4$ to 100 mol %,
   wherein the content of K$_3$AlF$_6$ in the fundamental flux is equal to or lower than 2 mol % including 0 mol %,
   wherein the content of free KF in the flux is lower than 0.2% by weight including 0% by weight, and
   wherein the flux further comprises from 0.1 to 8 weight % relative to the total weight of the flux of at least one additive salt selected from group consisting of BaF$_2$ and SrF$_2$.

2. The flux according to claim 1, wherein the flux further comprises at least one brazing additive selected from the group consisting of Si, LiOH, LiF, Li fluoroaluminates, lithium potassium fluoroaluminates, solder metals and solder metal precursors.

3. The flux according to claim 1, wherein the at least one additive salt is present in an amount of equal to or more than 1 weight %.

4. The flux according to claim 1, wherein the at least one additive salt is present in an amount of from equal to or less than 8 weight %.

5. The flux according to claim 1, wherein the fundamental flux comprises a molar content of equal to or higher than 98 mol % KAlF4.

6. A flux composition comprising a flux according to claim 1, and at least one fluxing additive selected from the group consisting of solvents, binders, thickeners, suspension stabilizers, antifoaming agents, surfactants and thixotropic agents.

7. Aluminum parts or aluminum alloy parts for brazing, coated at least partially with a flux according to claim 1.

8. A process for brazing of metal parts made from aluminum or aluminum alloys with metal parts made from aluminum, aluminum alloys, copper, titanium or steel, which comprises the steps of
   a) coating metal parts at least partially with the flux according to claim 1;
   b) optionally drying the at least partially coated metal parts;
   c) assembling the at least partially coated metal parts;
   d) heating the assembled, at least partially coated metal parts to a temperature sufficiently high to braze the at least partially coated metal parts;
   e) brazing the at least partially coated metal parts;
   f) optionally cooling the brazed parts.

9. The process according to claim 8, wherein step c) and/or d) are performed at a temperature equal to or higher than 540° C., and at a temperature equal to or lower than 650° C.

10. The process according to claim 8, wherein step c) and/or d) are performed in the presence of a protective gas containing equal to or more than 75% by volume of at least one gas selected from the group consisting of helium, nitrogen, argon and xenon.

11. A brazed metal object, obtained according to the process of claim 8.

12. The brazed metal object according to claim 11, which forms part of a cooler for stationary or mobile refrigeration equipment, or of a stationary heat exchanger.

13. Aluminum parts or aluminum alloy parts for brazing, coated at least partially with a flux composition according to claim 9.

14. A process for brazing of metal parts made from aluminum or aluminum alloys with metal parts made from aluminum, aluminum alloys, copper, titanium or steel, which comprises the steps of:
   a) coating metal parts at least partially with the flux according to claim 6;
   b) optionally drying the at least partially coated metal parts;
   c) assembling the at least partially coated metal parts;
   d) heating the assembled, at least partially coated metal parts to a temperature sufficiently high to braze the at least partially coated metal parts;
   e) brazing the at least partially coated metal parts;
   f) optionally cooling the brazed parts.

15. The process according to claim 14, wherein step c) and/or d) are performed at a temperature equal to or higher than 540° C., and at a temperature equal to or lower than 650° C.

16. The process according to claim 14, wherein step c) and/or d) are performed in the presence of a protective gas containing equal to or more than 75% by volume of at least one gas selected from the group consisting of helium, nitrogen, argon and xenon.

17. A brazed metal object, obtained to the process of claim 14.

* * * * *